FIG. 1

Inventors
Charles J. Plank
Edward J. Rosinski
By Raymond W. Barclay
Attorney

FIG. 2

Inventors
Charles J. Plank
Edward J. Rosinski
By Raymond W. Barclay
Attorney

FIG. 3

Inventors
Charles J. Plank
Edward J. Rosinski
Attorney

FIG. 4

X Catalyst of Examples 11-14
▯ Catalyst of Examples 15-18
△ Catalyst of Examples 19-21

Inventors
Charles J. Plank
Edward J. Rosinski
By Raymond W. Barclay
Attorney

United States Patent Office 3,257,310
Patented June 21, 1966

3,257,310
STEAM ACTIVATED CATALYST
Charles J. Plank, Woodbury, and Edward J. Rosinski, Deptford, N.J., assignors to Socony Mobil Oil Company, Inc., a corporation of New York
Filed July 2, 1964, Ser. No. 379,813
The portion of the term of the patent subsequent to July 7, 1981, has been disclaimed
23 Claims. (Cl. 208—120)

This invention relates to an improved hydrocarbon conversion catalyst and to the conversion, in the presence of said catalyst, of hydrocarbon oils into lower boiling normally liquid and gaseous products. More particularly, the invention relates to catalytic cracking of hydrocarbon oils in the presence of a catalyst which has undergone activation upon treatment with steam. In one embodiment, the invention is concerned with an improved crystalline aluminosilicate cracking catalyst, characterized by unusual activity and selectivity as a result of specified treatment thereof with steam. In another embodiment, the invention is directed to a method for preparing the aforementioned catalyst useful in catalytic cracking of heavy petroleum fractions to lighter materials boiling in the gasoline range.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commercially available cracking catalysts, a synthetic silica-alumina gel composite is by far the most widely used. While such type catalyst is superior in many ways to the earlier employed clay catalysts and is fairly satisfactory, it is subject to improvement, particularly in regard to its ability to afford a high yield of useful product with a concomitantly small yield of undesired product.

During catalytic conversion of high boiling hydrocarbons to lower boiling hydrocarbons, the reaction which takes place is essentially a cracking to produce lighter hydrocarbons, but a number of complex side reactions, such as aromatization, polymerization, alkylation and the like also proceed. As a result of these complex reactions, a carbonaceous deposit is laid down on the catalyst commonly called "coke." The deposition of coke tends to impair the catalytic efficiency of the catalyst for the principal reaction, and the conversion reaction is thereafter suspended after coke, to the extent of a few percent by weight, has accumulated on the catalyst. The catalytic surface may be regenerated by burning the coke in a stream of oxidizing gas, and the catalyst returned to the conversion stage of the cycle.

As will be realized, coke and other undesired products are formed at the expense of useful products, such as gasoline. It will also be evident that during the period of regeneration, the catalyst is not being effectively employed for conversion purposes. It accordingly is highly desirable not only to afford a large overall conversion of the hydrocarbon charge, i.e., to provide a catalyst of high activity, but also to afford an enhanced yield of useful product, such as gasoline, while maintaining undesired product, such as coke, at a minimum. The ability of a cracking catalyst to control and to direct the course of conversion is referred to as selectivity. Thus, an exceedingly useful and widely sought characteristic in a cracking catalyst is high selectivity.

As a result of coke formation, it has generally been necessary to regenerate the catalyst at frequent intervals, first by stripping out entrained oil with steam and then by burning off the carbonaceous deposits with an oxygen-containing gas at elevated temperature. However, it has been observed that the cracking activity of the catalyst deteriorates upon repeated use and regeneration and that the silica-alumina gel catalysts heretofore employed have been deactivated upon being contacted with steam. Since steaming has been found to be the most effective way of removing entrained oil from the spent catalyst prior to thermal regeneration with air and since steam is encountered in the seals and kiln of a commercial catalytic cracking unit, such deactivation of the heretofore employed silica-alumina gel catalyst has proved to be highly detrimental to catalytic conversion systems utilizing such catalyst.

Briefly, the present invention provides a method of preparing a unique cracking catalyst of high activity and selectivity by subjecting a crystalline aluminosilicate having uniform pore openings between about 6 and 15 Angstrom units to steam treating at a temperature between about 400 and about 1450° F. for a period of at least 2 hours and generally within the approximate range of 2 to 100 hours. When low partial pressures of steam are used the upper temperature may be as high as 1750° F. for a period of at least 30 minutes.

In accordance with the present invention, there is now provided a catalyst for conversion of hydrocarbons which, in contradistinction to the aforenoted deactivation, undergoes, upon being subjected to steam, activation with a resultant ability to afford a distinctly higher yield of gasoline and a lower yield of coke over comparable catalysts which have not been so contacted with steam. The catalyst, described herein, is one comprising a crystalline aluminosilicate preferably substantially devoid of sodium and characterized by an ordered structure of uniform pore size. Generally, the crystalline aluminosilicate employed possesses uniform pore openings between about 6 and about 15 Angstrom units. In one embodiment, the catalyst is derived from an intimate admixture of a finely divided crystalline aluminosilicate and a binder therefor under conditions such that the aluminosilicate is distributed throughout and held suspended in a matrix of the binder, which is subsequently treated with steam at a temperature between about 400 and about 1450° F. to an extent such that the initial surface area thereof is reduced by at least about 20 percent but not in excess of about 80 percent. The catalyst of the present invention, in contrast to previous conventional cracking catalysts, is produced from a crystalline aluminosilicate having a structure of rigid three-dimensional networks characterized by uniform pores generally between 6 and 15 Angstrom units in diameter. The uniform pore openings in such range occur in all dimensions and permit easy access to the catalyst surface of all hydrocarbon reactant molecules and afford ready release of the product molecules. The catalyst further unexpectedly possesses, as a result of the aforenoted high temperature steam treatment, exceptional catalytic cracking activity and selectivity.

In another embodiment, the present invention provides a method for preparing a unique cracking catalyst by effecting dispersion in a suitable matrix of a finely divided crystalline aluminosilicate having uniform pore openings between about 6 and about 15 Angstrom units, drying, and treating the resulting composite with steam at a temperature between about 400 and about 1450° F. to reduce the surface area of the composite by at least about 20 percent but not in excess of about 80 percent.

In still another embodiment, the present invention affords a method for preparing a hydrocarbon conversion catalyst by dispersing in an inorganic oxide sol, a finely divided crystalline aluminosilicate resulting from substantially complete base exchange of the alkali metal content of a crystalline alkali metal aluminosilicate having uniform pore openings between 6 and 15 Angstrom units with a solution of ionizable compound of a rare earth metal, calcium, manganese, magnesium, hydrogen, a hydrogen precursor, or mixtures theerof with one another, effecting gelation of the sol containing said finely divided aluminosilicate, washing the resulting composite free of soluble matter, drying and treating the composite with steam at a temperature between about 400 and about 1450° F. for a period of between about 2 and about 100 hours. The composite may be calcined, if desired, before steam treatment.

In still another embodiment, the present invention provides a cracking catalyst having exceptional activity and selectivity consisting essential of 1 to 90 percent by weight of a crystalline aluminosilicate substantially devoid of sodium having a weight mean particle diameter of less than 40 microns, and preferably less than 15 microns suspended in and distributed throughout a hydrous oxide matrix selected from the group consisting of clays and inorganic oxide gels and which has been subjected to pretreatment with steam to reduce the initial surface area thereof by at least about 20 percent but not in excess of about 80 percent.

A still further embodiment of the invention affords a catalytic composition comprising spheroidal particles consisting essentially of 2 to 50 percent by weight of a crystalline aluminosilicate substantially devoid of sodium having a weight mean particle diameter of between 2 and 7 microns suspended in and distributed throughout a matrix of an inorganic oxide gel selected from the group consisting of alumina, silica and composites of silica and an oxide of at least one metal selected from the group consisting of metals of Groups IIA, IIIB and IVA of the Periodic Table, which particles have undergone treatment with steam to reduce the initial surface area thereof by at least about 20 percent but not in excess of about 80 percent.

A still further embodiment of the invention resides in processes for catalytic cracking of hydrocarbon oils in the presence of the above catalysts in accordance with which an enhanced conversion of the charge stock to useful products is realized.

The crystalline aluminosilicates employed in preparation of the instant catalyst may be either natural or synthetic zeolites. Representative of particularly preferred zeolites are zeolite X, zeolite Y, zeolite L, faujasite and mordenite. Synthetic zeolites have been generally described by Barrer in several publications and in U.S. Patent 2,306,610 and U.S. Patent 2,413,134. These materials are essentially the dehydrated forms of crystalline hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities and channels are precisely uniform in size. The alkali metal aluminosilicate used in preparation of the present catalyst has a uniform pore structure comprising openings characterized by an effective pore diameter of between 6 and 15 Angstroms.

In general, the process for preparing such alkali metal aluminosilicate involves heating, in aqueous solution, an appropriate mixture of oxides, or of materials where chemical compositions can be completely represented as a mixture of oxides $Na_2O$, $Al_2O_3$, $SiO_2$ and $H_2O$ at a temperature at approximately 100° C. for periods of 15 minutes to 90 hours or more. The product, which crystallizes within this hot mixture is separated therefrom and water washed, until the water in equilibrium with the zeolite has a pH in the range of 9 to 12, and thereafter is dehydrated by heating.

Generally, an alkali metal silicate serves as the source of silica and an alkali metal aluminate as the source of alumina. An alkali metal hydroxide is suitably used as the source of the alkali metal ion and, in addition, contributes to the regulation of the pH. All reagents are preferably soluble in water. While, it is contemplated that alkali metal aluminosilicates having the above-designated pore characteristics may be employed in preparation of the present catalyst, it is generally preferred to use a sodium aluminosilicate. Thus, assuming sodium as the alkali metal, the reaction mixture should contain a molar ratio of $Na_2O/SiO_2$ of at least 0.2/1 and generally not in excess of 7/1. Sodium aluminate having a molar ratio of $Na_2O/Al_2O_3$ in the range of 1/1 to 3/1 may be employed. The amounts of sodium silicate solution and sodium aluminate solutions are such that the mol ratio of silica to alumina in the final mixture is at least 2/1. Generally, the reaction solution has a composition expressed as mixtures of oxides, within the following ranges: $SiO_2/Al_2O_3$ of 2 to 40, $Na_2O/SiO_2$ of 0.2 to 7 and $H_2O/Na_2O$ of 10 to 90. The reaction mixture is placed in a suitable vessel which is closed to the atmosphere in order to avoid losses of water and the reagents are then heated for an appropriate length of time. A convenient and generally employed process for making the sodium aluminosilicate reactant involves preparing an aqueous solution of sodium aluminate and sodium hydroxide and then mixing with an aqueous solution of sodium silicate. While satisfactory crystallization may be obtained at temperatures from 21° C. to 125° C., the pressure being atmospheric or less corresponding to the equilibrium of the vapor pressure with the mixture at the reaction temperature, crystallization is ordinarily carried out at about 100° C. As soon as the zeolite crystals are completely formed, they retain their structure and it is not essential to maintain the temperature of the reaction any longer in order to obtain a maximum yield of crystals.

After formation, the crystalline aluminosilicate is separated from the mother liquor, usually by filtration. The crystalline mass is then washed, preferably with water while on the filter, until the wash water, in equilibrium with the aluminosilicate, reaches a pH of 9 to 12. For purposes of the present invention, the sodium aluminosilicate crystals when incorporated in a matrix may be added without drying to the binder therefor or may alternatively be initially dried, generally at a temperature between 25° C. and 150° C.

The catalysts utilized in the present process are preferably prepared by intimately admixing a crystalline alkali metal aluminosilicate, such as described hereinabove, having a structure of rigid three-dimensional networks characterized by a uniform effective pore diameter between 6 and 15 Angstrom units in finely divided form, generally having a weight mean particle diameter of less than about 40 microns, and preferably less than about 15 microns, with a suitable binder such as clay or an inorganic oxide gel, base exchanging the resulting composite substantially free of alkali metal by treating with a solution containing an ionizable compound of a rare earth metal, calcium, manganese, magnesium, hydrogen, a hydrogen precursor or mixtures thereof with one another, and subjecting the same to a drying activating treatment in the presence of steam. Alternatively, the crystalline alkali metal aluminosilicate may undergo base exchange, as above, prior to intimate admixture thereof with the binder. In accordance with such manner of operation, the resulting mixture of finely divided previously base-exchanged crystalline aluminosilicate distributed throughout and held suspended in a matrix of the binder is dried and activated with steam as described hereinabove.

The matrix or binder, into which the crystalline aluminosilicate, before or after base-exchange, is incorporated, is generally a strong, attrition-resistant material, and consequently the preferred catalyst composite after steam treatment exhibits commercially desirable characteristics of high activity, selectivity and attrition resistance. Alternatively, however, the crystalline aluminosilicate may be steam treated without incorporation in a matrix or binder, which activated crystalline aluminosilicate in and of itself exhibits high activity and selectivity. Thus, a steam treated base-exchanged substantially sodium-free crystalline aluminosilicate, both by itself and incorporated in a suitable matrix, as an improved cracking catalyst exhibiting high activity and selectivity, is within the purview of the present invention.

In a preferred embodiment, intimate admixture of the finely divided crystalline aluminosilicate and binder, such as inorganic oxide hydrogel, may be accomplished, for example, by ball milling the two materials together over an extended period of time, preferably in the presence of water, under conditions to reduce the particle size of the aluminosilicate to a weight mean particle diameter of less than 40, and preferably less than 15 microns. Such method of admixture, however, is less preferred than that achieved by dispersing the powdered crystalline aluminosilicate in an inorganic oxide hydrosol. Following this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. As noted hereinabove, it is desirable that the aluminosilicate introduced into the hydrosol have a weight mean particle diameter less than about 40 microns and preferably less than 15 microns, and when large particles are desired, between 2 and 7 microns. The use of aluminosilicate having a weight mean particle diameter in excess of 40 microns may give rise to a physically weak product, while the use of aluminosilicate having a weight mean particle diameter of less than 1 micron can produce a product of low diffusivity.

The powder-containing inorganic oxide hydrosol sets to a hydrogel after lapse of a suitable period of time and the resulting hydrogel is base-exchanged with a solution containing ions selected from the group consisting of rare earth metals, calcium, manganese, magnesium, hydrogen, hydrogen precursors and mixtures thereof with one another, if zeolitic alkali metal has been introduced as a result of employing an alkali metal aluminosilicate and is thereafter dried to a gel and subjected to treatment with steam at a temperature between about 400 and about 1450° F. Alternatively, the gel may be calcined before steam treatment. It has been found that the resulting product consisting essentially of a crystalline aluminosilicate suspended in and distributed throughout the matrix of inorganic oxide gel possesses unique properties as a cracking catalyst.

The inorganic oxide gel preferably employed as a matrix for the crystalline aluminosilicate powder may be a gel of any hydrous inorganic oxide, such as, for example, aluminous or silceous gels. While alumina gel or silica gel, as will be evident from data hereinafter set forth, may be utilized as a suitable matrix, it is preferred that the inorganic oxide gel employed be a cogel of silica and an oxide of at least one metal selected from the group, consisting of metals of Groups IIA, IIIB, and IVA of the Periodic Table. Such components include, for example, silica-alumina, silica-magnesia, silica-zirconia, silica-thoria, silica-beryllia and silica-titania, as well as ternary combinations such as silica-alumina-thoria, silica-alumina-zirconia, silica-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and inorganic oxide gel matrix may vary widely with the crystalline aluminosilicate content ranging from about 1 to about 90 percent by weight and more usually, particularly where the composite is prepared in the form of beads, in the range of about 2 to about 50 percent by weight of the composite.

The preferred inorganic oxide gel crystalline aluminosilicate may be prepared in any desired physical form. Thus, the hydrosol containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. The method of the invention, as indicated above, has been found to be particularly useful for the production of catalyst in the form of spheroidal particles. The hydrosol containing powdered aluminosilicate produced in accordance with this invention may be made into spheroidal particles by any feasible process, such as methods described in patents to Marisic, for example, U.S. 2,384,946. Broadly, such methods involve introducing globules of hydrosol into a body of water-immiscible liquid, for example, an oil medium wherein the globules of hydrosol set to a hydrogel and subsequently pass into an underlying layer of water from which they are sluiced to further processing operations such as base exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spheroidally shaped particles is of particular advantage in hydrocarbon conversion processes, including the moving catalyst bed processes, the fluidized process, etc in which the spheroidal gel particles are subjected to continuous movement. As applied to the stationary bed, spheroidal catalyst particles provide effective contact between the reactants and the catalyst by avoiding channeling It is accordingly a preferred embodiment of the present invention to prepare the described catalyst in the form of spheres of a crystalline aluminosilicate in a matrix, although it is to be realized that the method of the invention may also be employed in obtaining a mass of catalyst which may, thereafter, be broken up into particles of desired size and in utilizing a crystalline aluminosilicate in and of itself or with other components. Likewise, the methods described herein may be used for the preparation of the present catalysts in the form of particles of any other desired size or shape.

While, for the production of the preferred spheroidal catalyst particles by the aforementioned technique, initial formation of a hydrosol which sets upon lapse of a short interval of time to an all embracing bead-form hydrogel is essential, it is within the purview of this invention to also employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two. Also, the matrix may consist of or contain, as a component thereof, a clay and particularly a clay of the montmorillonite or kaolinite families, either raw or acid treated. Other suitable materials for use as the matrix of the present catalyst composition include charcoal, graphite, bauxite, and other binders compatible with the crystalline aluminosilicate and thermally stable under the temperature conditions at which the catalyst is used.

As indicated hereinabove, the crystalline alkali metal aluminosilicate may be base-exchanged with a solution containing rare earth metal, calcium, manganese, magnesium, hydrogen or hydrogen precursor ions, including mixtures thereof with one another, either before or after intimate admixture with the binder therefor. Base exchange is effected by treatment with a solution containing exchange ions. It is contemplated that any ionizable compound of a rare earth metal, calcium, manganese, magnesium, hydrogen, hydrogen precursors or mixtures thereof may be employed for base exchange. Generally, an aqueous solution of a suitable salt or mixture of salts should be employed. Thus, the rare earth metal salt may be a chloride, sulfate, nitrate, formate, or acetate of cerium, lanthanum, praseodymium, neodymium, samarium and other rare earths, as well as solutions containing mixtures of these ions and mixtures of the same with other ions, such as ammonium. Similarly, the calcium, manganese or magnesium salt may be a chloride, sulfate, nitrate and the like. The hydrogen ion may be added in the form of a mineral or organic acid such as hydrochloric, nitric, sulfuric or formic acid and the like, under conditions such that the structure of the crystalline aluminosilicate is not adversely affected. The hydrogen precursor may be an organic or inorganic ammonium compound, generally an inorganic ammonium salt, which upon heating undergoes thermal degradation to hydrogen. A particularly effective base-exchange solution for continuous exchange is one containing rare earth metal and ammonium ions in the ration of $1/10$ to $1/100$ to effect replacement of the alkali metal ion with rare earth and ammonium ions. Another effective method of exchange is to replace more than 75 percent of the alkali metal ion by contact with a solution of rare earth metal ions or rare earth metal and ammonium ions, followed by completing the alkali metal exchange, to less than 3 percent exchangeable alkali metal content, with ammonium ion exchange. Additional particularly effective base exchange solutions contain about 1 to 5 percent aqueous solutions of calcium chloride, manganese chloride, magnesium chloride, ammonium chloride or mixtures thereof, such as a combined solution of manganese chloride and ammonium chloride, magnesium chloride and ammonium chloride, or calcium chloride and ammonium chloride.

The exchangeable alakli metal content of the finished catalyst should be less than about 3 and preferably less than about 1 percent by weight. The base exchange solution may be contacted with the crystalline aluminosilicate of uniform pore structure in the form of a fine powder, a compressed pellet, extruded pellet, spheroidal bead or other suitable particle shape It has been found that the desired base exchange may be effected most readily if the alkali metal aluminosilicate undergoing treatment has not previously been subjected to a temperature above about 600° F.

Base exchange required for introducing exchange ions is carried out for a sufficient period of time and under appropriate temperature conditions to replace at least about 75 percent of the alkali metal originally contained in the aluminosilicate and to reduce effectively the exchangeable alkali metal content of the resulting composite to below about 3 weight percent.

While water will ordinarily be the solvent in the base exchange solutions employed, it is contemplated that other solvents, although generally less preferred, may be used. Thus, in addition to aqueous solutions, alcoholic solutions, etc. of suitable exchange compounds as noted above, may be employed in producing the catalyst utilized in the present process. It will be understood that the compounds employed for the base-exchange solution undergo ionization in the particular solvent used.

The concentration of the exchange compound employed in the base-exchange solution may vary depending on the nature of the particular compound used, on the alkali metal aluminosilicate undergoing treatment and on the conditions under which treatment is effected. The overall concentration of replacing ion, however, is such as to reduce the exchangeable alkali metal content of the original alkali metal aluminosilicate to less than about 3 percent by weight, on a dry basis. Generally, the concentration of the exchange compound is within the range of 0.2 to 30 percent by weight, although as noted hereinabove other solution concentrations may be employed, providing the exchangeable alkali metal content is reduced to less than about 3 and preferably less than 1 percent by weight.

The temperature at which base-exchange is effected may vary widely, generally ranging from room temperature to an elevated temperature below the boiling point of the treating solution. While the volume of base-exchange solution employed may vary widely, generally an excess is employed and such excess is removed from contact with the crystalline aluminosilicate after a suitable period of contact. The time of contact between the base-exchange solution and crystalline aluminosilicate in any instance in successive contacts is such as to effect replacement of the alkali metal ions thereof to an extent such that the exchangeable alkali metal content of the composite after undergoing base exchange is less than 3 percent by weight. It will be appreciated that such period of contact may vary widely depending on the temperature of the solution, the nature of the alkali metal aluminosilicate used and the particular exchange compound employed. Thus, the time of contact may extend from a brief period of the order of a few hours for small particles to longer periods of the order of days for large pellets.

After base-exchange treatment, the product is removed from the treating solution. Anions introduced as a result of treatment with the base-exchange solution may be removed, if desired or necessary, by water-washing the treated composite until the same is free of said anions. The washed product is then dried, generally in air, to remove substantially all of the water therefrom. While drying may be effected at ambient temperature, it is more satisfactory to facilitate the removal of moisture by maintaining the product at a temperature between about 150 and about 600° F. for 4 to 48 hours.

The dried material may, if desired, then be subjected to calcination by heating in an inert atmosphere, i.e., one which does not adversely affect the catalyst, such as air, nitrogen, hydrogen, flue gas, helium or other inert gas. Generally, the dried material is heated in air to a temperature in the approximate range of 500° F. to 1500° F. for a period of at least about 1 hour and usually between 1 and 48 hours.

In accordance with the present invention, the composite, after drying, is subjected to an activation treatment with steam. The steam treatment may be effected as a component step in the catalyst preparation or within the reactor unit during conversion. As an alternate to the above manner of procedure, the crystalline aluminosilicate by itself or preferably suspended in and distributed throughout a matrix is directly contacted with and dried during the activation treatment with steam. Under such conditions, calcination may be omitted or may be carried out subsequent to the steam treatment as a separate step or during the catalytic operation in which the catalyst is employed. Exposure of the catalytic composite to steam, as will appear from data set forth hereinafter, provides a product of high catalytic activity and selectivity capable of affording in catalytic conversion processes an enhanced yield of gasoline. Steam treatment may be carried out at a temperature within the approximate range of 400 to 1450° F. for at least about 2 hours. Usually, steam at temperature of about 1000° F. to 1400° F. will be used with the treating period extending from about 2 to about 100 hours. Temperatures above 1450° F. may be detrimental and should generally be avoided. Also, an atmosphere consisting of a substantial amount of steam, say at least 5 percent by volume, but containing air or other gas substantially inert with respect to the composite being treated may be used and such mixtures may, in some instances be desirable at elevated temperatures to avoid possible deactivation of the catalyst. Steam treatment may be effected at pressures from atmospheric up to about 500 p.s.i.g., with increasing pressure requiring comparably less exposure of the catalyst to steam to achieve equivalent activation.

The above-noted steam treatment serves to reduce the surface area of the composite catalyst. Thus, it is a particular embodiment of the present invention to steam the above-described composite to reduce the surface area thereof by at least about 20 percent but not in excess of about 80 percent. The initial surface area of a calcined crystalline aluminosilicate composite is generally within the approximate range of 100 to 600 square meters per gram. Thus, the final surface area of the activated catalyst, whether or not previously calcined, after the above-described steam treatment would generally be within the approximately range of 75 to 480 square meters per gram.

Cracking, utlizing the catalyst described herein, may be carried out at catalytic cracking conditions employing a temperature within the approximate range of 500 to 1200° F. and under a pressure ranging from sub-atmospheric pressure up to several hundred atmospheres. The contact time of the oil within the catalyst is adjusted in any case, according to the conditions the particular oil feed and results desired, to give a substantial amount of cracking to lower boiling products. Cracking may be effected in the presence of the instant catalyst utilizing well-known techniques including, for example, those wherein the catalyst is employed as a fluidized mass or as a compact particle-form moving bed.

The cracking activity of the catalyst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 875° F. to 900° F., substantially atmospheric pressure and a feed rate of 1.5 to 8 volumes of liquid oil per volume of catalyst per hour for ten minute runs between regenerations.

It has been found desirable in analyzing the results obtained with the catalyst described hereinabove to compare the same with those realized with a conventional commercial silica-alumina gel cracking catalyst containing approximately 10 weight percent alumina. The exceptional activity and selectivity of the present catalyst is emphasized by a comparison of the various product yields obtained with such catalyst with yields of the same products given by the conventional silica-alumina catalyst at the same conversion level. The differences ($\Delta$ values) shown hereinafter represent the yields given by the present catalyst minus yields given by the conventional catalyst.

The following examples will serve to illustrate the catalyst and method of the present invention without limiting the same.

*Example 1*

The following reactant solutions were employed—

Solution A:
 17.4 lbs. N-brand sodium silicate
 8.78 lbs. $H_2O$

Solution B (slurry):
 2.96 lbs. crystalline 13X sodium aluminosilicate (60.5% solids)
 7.31 lbs. $H_2O$ Solution B was added to Solution A with vigorous agitation. The composition and specfic gravity of the resulting solution was as follows:

Specific gravity, 1.196 @ 78° F.
$SiO_2$, 13.7 wt. percent
$Na_2O$, 4.3 wt. percent
Sodium aluminosilicate, 4.9 wt. percent
$H_2O$, 77.1 wt. percent Solution C:
 28.55 lbs. $H_2O$
 2.12 lbs. $Al_2(SO_4)_3 \cdot 18H_2O$
 0.99 lb. $H_2SO_4$ (96.7%)
 Specific gravity, 1.051 at 100° F.

The composition of this solution was as follows:

$Al_2O_3$, 1.01 wt. percent
$SO_4^=$, 5.94 wt. percent
$H_2O$, 93.05 wt. percent The solution resulting from admixture of Solutions A and B was continuously mixed with Solution C in a mixing nozzle by adding 415 cc./min. of the former at 70° F. to 380 cc./min. of the latter solution at 60° F. The hydrosol so obtained had a pH of 8.6 to 8.8 and set to a hydrogel at 68° F. in 1.7 to 2.1 seconds. The composition of the product at this point, on a dry basis, was 75 weight percent silica-alumina hydrogel matrix containing 94 percent $SiO_2$ and 6 percent $Al_2O_3$, having 25 percent of sodium aluminosilicate dispersed therein.

The aforementioned hydrosol was formed into beads of hydrogel by introducing the sol in the form of droplets into an immiscible oil. The bead hydrogel so attained was base-exchanged by contacting with a 2 weight percent rare earth metal chloride solution having the following composition: 0.56 percent cerium chloride, 0.37 percent lanthanum chloride, 0.09 percent praseodymium chloride, 0.27 percent neodymium chloride and traces of samarium chloride, gadolinium chloride and other rare earth metal chlorides. Base exchange was carried out for a total of 12 contacts, 9 of which were of 2 hours duration and 3 of which were overnight (about 18 hours), using ½ volume of base exchange solution per volume of bead hydrogel. The base-exchanged bead hydrogel was water-washed free of chloride ions, dried for 20 hours at 270° F. in air and thereafter tempered for 10 hours at 1000° F. in air.

The finished catalyst composition at this point was 0.1 weight percent cerium, 0.44 percent sodium, 11.5 percent alumina, 73.1 percent silica and 14.9 percent rare earth metal oxides (primarily $Ce_2O_3$, $La_2O_3$, $Nd_2O_3$, $Pr_6O_{11}$, $Sm_2O_3$, $Gd_2O_3$).

*Example 2*

The composition of this example was prepared in the same manner as Example 1 except that the base exchange with the rare earth metal chloride solution was carried out for a total of 18 contacts, 13 of which were of 2 hours duration and 5 of which were overnight (about 18 hours).

The finished catalyst composition contained 0.2 weight percent cerium, 0.29 percent sodium, 10.7 percent alumina, 75.1 percent silica and 13.7 percent rare earth metal oxides (primarily $Ce_2O_3$, $La_2O_3$, $Nd_2O_3$, $Pr_6O_{11}$, $Sm_2O_3$, $Gd_2O_3$).

*Examples 3 to 6*

Samples of the catalyst of Example 1 were heated in an atmosphere of steam at 1225° F. and atmospheric pressure for periods of 20, 40, 88 and 150 hours, respectively.

TABLE I

| Example No. | 1 | 3 | 4 | 5 | 6 | 2 | 7 | 8 | 9 | 10 |
|---|---|---|---|---|---|---|---|---|---|---|
| Steam Treat: | | | | | | | | | | |
| Time, hrs | | 0 | 20 | 40 | 88 | 150 | 0 | 20 | 40 | 88 | 150 |
| Temp., °F | | 1,225 | 1,225 | 1,225 | 1,225 | | 1,225 | 1,225 | 1,225 | 1,225 |
| Pressure, p.s.i.g | | 0 | 0 | 0 | 0 | | 0 | 0 | 0 | 0 |
| Physical Properties: Surface area, m.²/g | 506 | 298 | | | 204 | ~500 | 195 | | | |
| Catalytic Evaluation: | | | | | | | | | | |
| LHSV | | 8 | 8 | 8 | 8 | 4 | 4 | 4 | 4 | 4 |
| Conv., vol. percent | | 57.1 | 56.2 | 58.3 | 58.8 | 62.6 | 65.3 | 68.5 | 67.9 | 68.5 |
| 10 R.V.P. Gaso., vol. percent | | 50.8 | 50.0 | 53.1 | 54.5 | 47.4 | 52.8 | 57.7 | 58.6 | 58.9 |
| Excess C₄'s, vol. percent | | 9.2 | 8.7 | 8.5 | 8.0 | 14.7 | 13.1 | 12.7 | 11.7 | 12.4 |
| C₅+gaso., vol. percent | | 47.3 | 46.6 | 49.3 | 50.3 | 45.2 | 49.9 | 54.5 | 55.0 | 56.1 |
| Total C₄'s, vol. percent | | 12.7 | 12.1 | 12.3 | 12.2 | 16.9 | 16.0 | 15.9 | 15.3 | 15.2 |
| Dry gas, wt. percent | | 5.6 | 5.2 | 5.4 | 5.3 | 7.9 | 7.4 | 7.4 | 6.6 | 6.2 |
| Coke, wt. percent | | 2.2 | 2.0 | 1.9 | 1.6 | 6.1 | 4.0 | 3.7 | 3.1 | 2.9 |
| H², wt. percent | | 0.0266 | 0.019 | 0.016 | 0.015 | 0.052 | 0.047 | 0.043 | 0.035 | 0.03 |
| Δ values to standard silica-alumina catalyst:* | | | | | | | | | | |
| 10 R.V.P. gaso, vol. percent | | +6.5 | +6.2 | +8.1 | +9.3 | +0.3 | +4.5 | +7.6 | +10.0 | +10.0 |
| Excess C₄'s, vol. percent | | −3.9 | −4.0 | −5.0 | −5.7 | −0.4 | −3.1 | −4.7 | −5.3 | −4.9 |
| C₅+gaso., vol. percent | | +5.2 | +5.0 | +6.6 | +7.3 | +0.3 | +3.8 | +7.3 | +8.5 | +9.2 |
| Total C₄'s, vol. percent | | −2.7 | −3.0 | −3.6 | −3.8 | −0.5 | −2.3 | −3.6 | −3.7 | −4.1 |
| Dry gas, wt. percent | | −1.5 | −1.7 | −1.9 | −2.1 | −0.1 | −1.2 | −1.8 | −2.5 | −3.0 |
| Coke, wt. percent | | −1.8 | −1.8 | −2.3 | −3.2 | +1.0 | −1.6 | −2.4 | −3.0 | −3.3 |

*Commercial silica-alumina gel cracking catalyst containing about 10 wt. percent Al₂O₃, and remainder SiO₂.

*Examples 7 to 10*

Samples of the catalyst of Example 2 were heated in an atmosphere of steam at 1225° F. and atmospheric pressure for periods of 20, 40, 88 and 150 hours, respectively.

The catalysts of Examples 1 to 10 were tested for activity and selectivity in catalytic gas oil cracking by conversion of a Mid-Continent gas oil having a boiling range of 450 to 950° F. to gasoline having an end point of 410° F. upon passage of vapors of the said gas oil through the catalyst at 900° F., substantially atmospheric pressure and at a feed rate of 2 to 8 volumes of liquid oil per volume of catalyst per hour for ten minute runs between regenerations. The results achieved and a comparison with the results obtained utilizing a conventional commercial silica-alumina gel cracking catalyst containing approximately 10 weight percent alumina at the same conversion are shown above in Table I:

Figure 1:
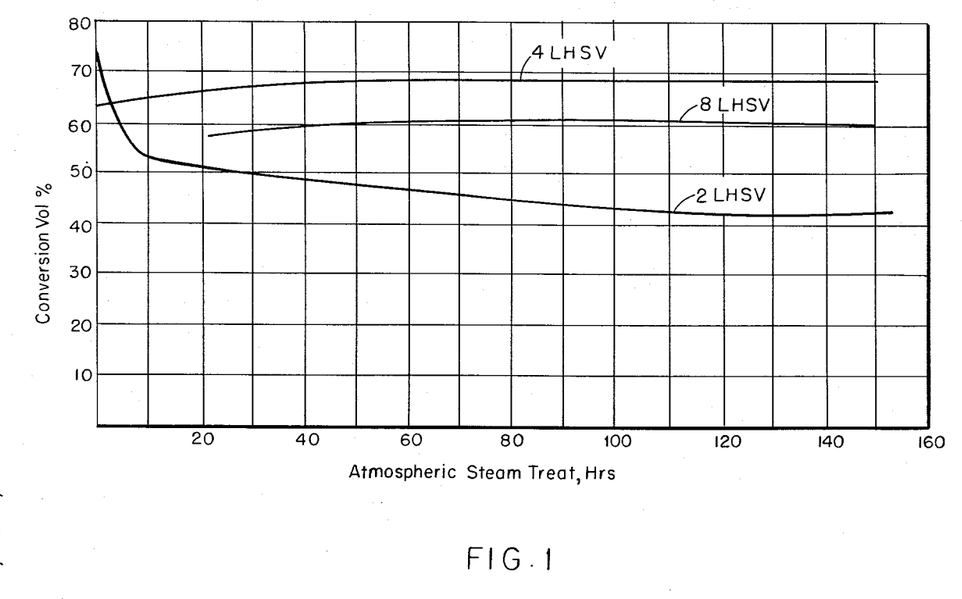
Figure 2:
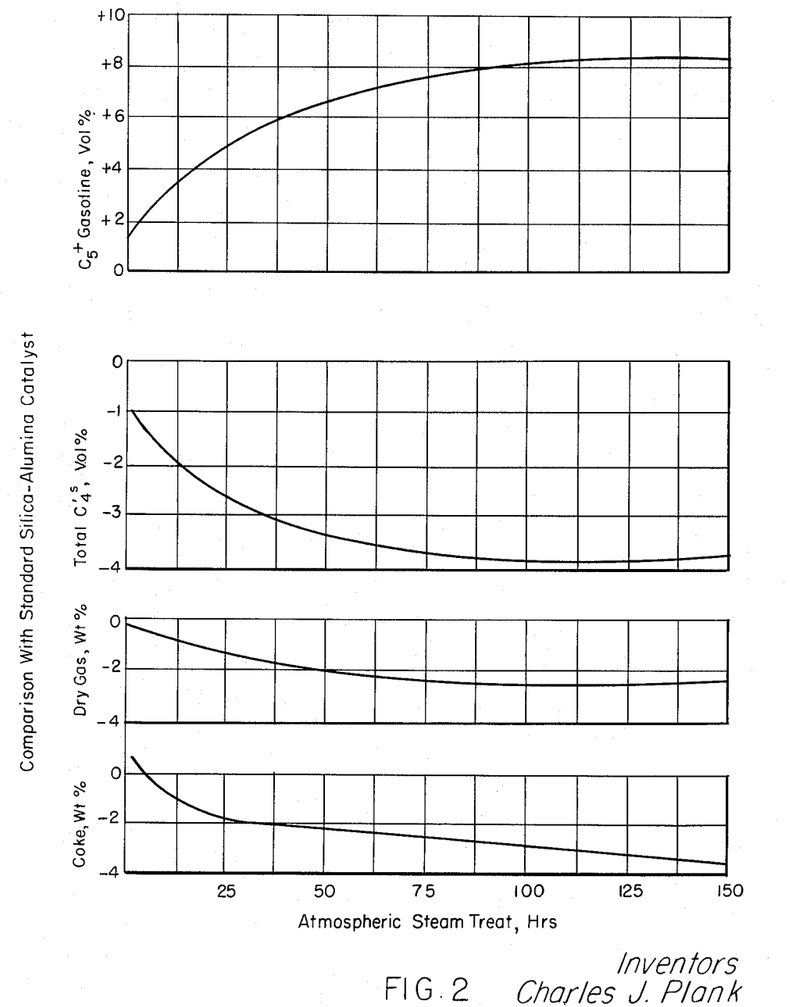

It will be evident form the foregoing data and the results shown graphically in FIGURES 1 and 2 that the steam treated catalysts in every case exhibited improvement in activity and especially in selectivity over the unsteamed catalysts as well as a marked improvement over the standard silica-alumina gel cracking catalyst, the results of which are shown graphically in FIGURE 1 by the curve designated 2 LHSV.

*Examples 11 to 14*

Samples of the catalyst of Example 1 where heated in a steam atmosphere at 1200° F. and 15 p.s.i.g. for periods of 10, 20, 30 and 60 hours, respectively.

*Examples 15 to 18*

Samples of the catalyst of Example 2 were treated in a steam atmosphere at 1200° F. and 15 p.s.i.g. for periods of 10, 20, 30 and 60 hours, respectively.

TABLE II

| Example No. | 1 | 11 | 12 | 13 | 14 | 2 | 15 | 16 | 17 | 18 | 19 | 20 | 21 |
|---|---|---|---|---|---|---|---|---|---|---|---|---|---|
| Base Exchange: | | | | | | | | | | | | | |
| Salt | | Cerium rare earth chlorides | | | | | Cerium rare earth chlorides | | | | | Rare earth chlorides—NH₄Cl | | |
| Conc., wt. percent | | 2 | | | | | 2 | | | | | 1 | | 1 |
| Contacts | | 9 (2 hour) and 3 overnight | | | | | 13 (2 hour) and 5 overnight | | | | | 24 hour continuous | | |
| Steam Treat: | | | | | | | | | | | | | |
| Time, hrs | 0 | 10 | 20 | 30 | 60 | 0 | 10 | 20 | 30 | 60 | 10 | 30 | 60 |
| Temp., °F | | 1,200 | 1,200 | 1,200 | 1,200 | | 1,200 | 1,200 | 1,200 | 1,200 | 1,200 | 1,200 | 1,200 |
| Pressure, p.s.i.g | | 15 | 15 | 15 | 15 | | 15 | 15 | 15 | 15 | 15 | 15 | 15 |
| Physical Properties: | | | | | | | | | | | | | |
| Surface area, m.²/g | 506 | 267 | 236 | 223 | 183 | ~500 | 269 | 248 | 228 | 199 | 236 | 210 | 183 |
| Catalytic Evaluation: | | | | | | | | | | | | | |
| LHSV | | 3 | 3 | 3 | 3 | 3 | 3 | 3 | 3 | 3 | 3 | 3 | 3 |
| Conv., vol. percent | | 70.9 | 70.9 | 72.0 | 69.4 | 70.8 | 68.1 | 72.9 | 71.3 | 72 | 76.7 | 75.6 | 74.0 |
| 10 R.V.P. Gaso., vol. percent | | 51.4 | 55.6 | 59.3 | 56.3 | 47.4 | 52.2 | | 54.5 | 58.7 | 56.1 | 58.9 | 56.3 |
| Excess C₄'s, vol. percent | | 17.5 | 16.0 | 15.5 | 18.6 | 19.1 | 16.2 | | 18.1 | 14.0 | 20.3 | 18.0 | 18.8 |
| C₅+ Gaso., vol. percent | | 49.4 | 53.2 | 56.7 | 54.1 | 44.9 | 50.1 | 55.4 | 53.2 | 55.5 | 54.0 | 56.7 | 54.7 |
| Total C₄'s vol. percent | | 19.5 | 18.4 | 18.2 | 18.0 | 20.7 | 18.4 | 18.6 | 19.4 | 17.3 | 22.4 | 20.3 | 20.5 |
| Dry gas, wt. percent | | 8.9 | 6.9 | 6.9 | 7.3 | 8.2 | 6.9 | 6.7 | 7.1 | 7.2 | 8.2 | 7.6 | 8.2 |
| Coke, wt. percent | | 6.4 | 5.4 | 4.7 | 4.2 | 9.0 | 5.7 | 5.5 | 5.6 | 4.6 | 6.4 | 5.0 | 5.0 |
| H₂, wt. percent | | | | | 0.03 | 0.06 | | | 0.03 | 0.02 | | | |
| Δ Values to standard silica-alumina catalyst:* | | | | | | | | | | | | | |
| 10 R.V.P. gaso., vol. volume | | +4.8 | +9.1 | +12.5 | +10.3 | +0.8 | +6.7 | | +7.7 | +11.7 | +7.6 | +10.9 | +8.8 |
| Excess C₄'s, vol. percent | | −4.0 | −5.7 | −6.6 | −5.8 | −2.4 | −4.2 | | −3.7 | −8.1 | −3.6 | −5.7 | −4.0 |
| C₅+ gaso., vol. percent | | +5.2 | +9.0 | +12.1 | +10.5 | +1.7 | +6.9 | +10.6 | +8.9 | +10.9 | +8.0 | +11.1 | +9.6 |
| Total C₄'s, vol. percent | | −4.4 | −5.6 | −6.2 | −5.2 | −3.2 | −4.3 | −6.1 | −4.7 | −7.1 | −4.0 | −5.7 | −4.7 |
| Dry gas, wt. percent | | −0.9 | −2.9 | −3.0 | −2.3 | −0.9 | −2.3 | −3.4 | −2.8 | −2.8 | −2.7 | −3.1 | −2.2 |
| Coke, wt. percent | | −0.9 | −2.0 | −2.9 | −2.7 | −0.9 | −0.8 | −2.4 | −1.8 | −3.0 | −3.0 | −3.9 | −3.3 |

*Commercial silica-alumina gel cracking catalyst containing about 10 wt. percent Al₂O₃ and remainder SiO₂.

Examples 19 to 21

The compositions of these examples were prepared in a manner analogous to that of Example 1 except that the hydrogel was base exchanged with an aqueous solution of 1 weight percent rare earth metal chloride and 1 percent ammonium chloride. The composition of the rare earth metal chloride mixture employed (reported as oxides) was:

| | Weight percent |
|---|---|
| Cerium oxide ($CeO_2$) | 20 |
| Lanthanum oxide ($La_2O_3$) | 11 |
| Praseodymium oxide ($Pr_6O_{11}$) | 3 |
| Neodymium oxide ($Nd_2O_3$) | 9 |
| Samarium oxide ($Sm_2O_3$) | 1 |
| Gadolinium oxide ($Gd_2O_3$) | 0.3 |
| Other rare earth oxides | 0.1 |

The finished catalyst contained 0.05 weight percent sodium and 11.4 percent rare earth metal oxides including a cerium oxide content of 4.8 percent.

Samples of this catalyst were treated with steam at 1200° F. for 10, 30 and 60 hours and reported as Examples 19, 20 and 21 respectively.

Figure 3:
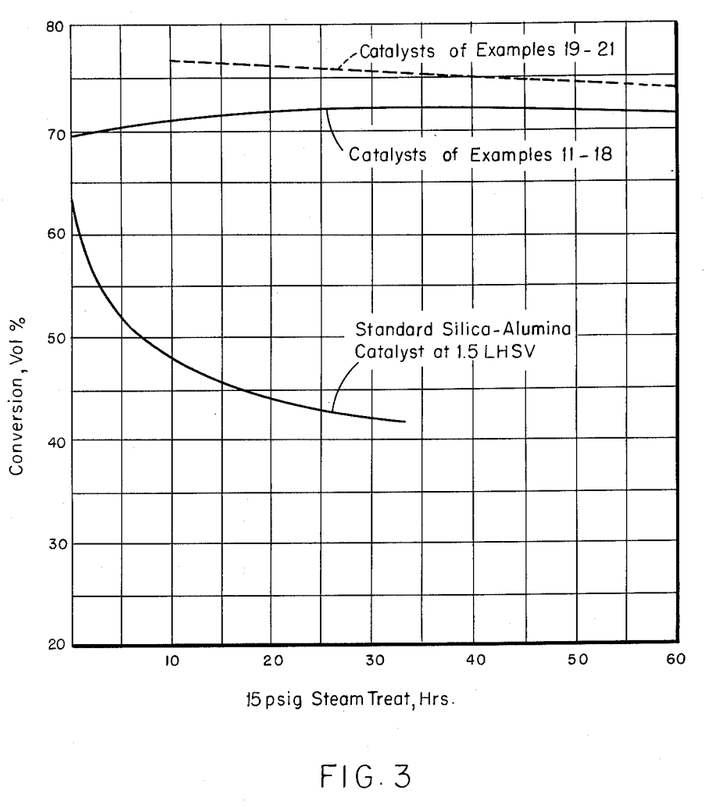
Figure 4:
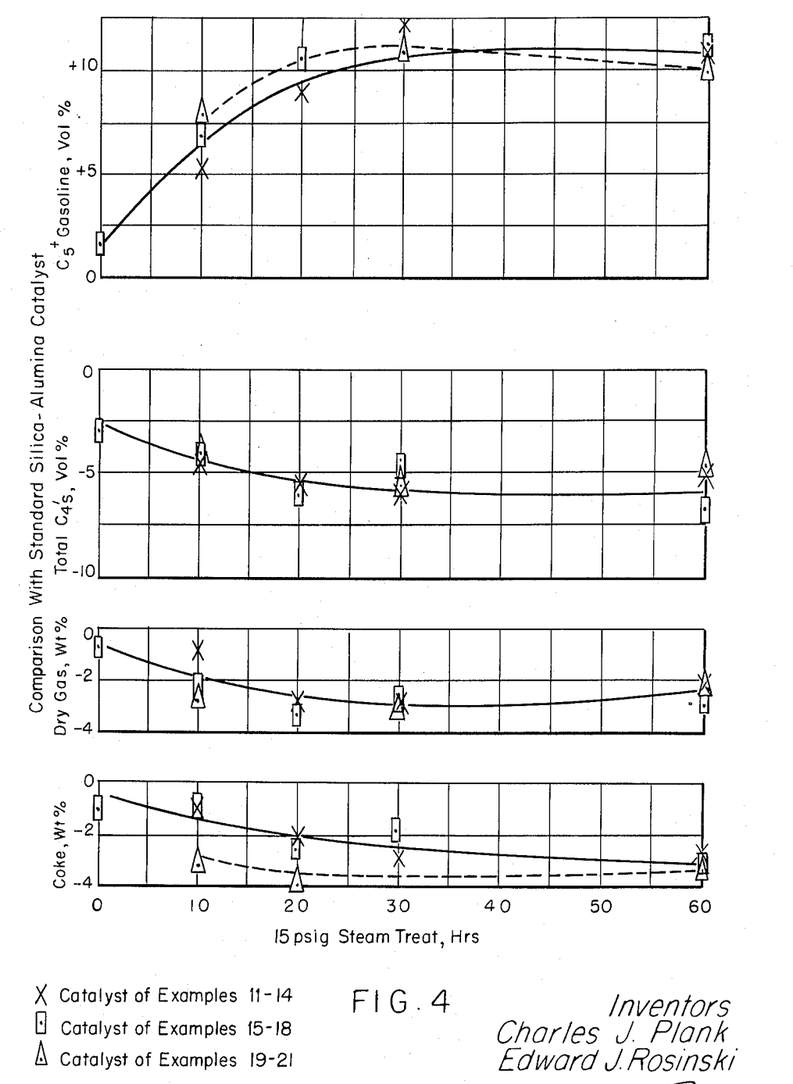

The catalysts of Examples 11 to 18 and 19 to 21 were tested for activity and selectivity by charging a gas oil, as described above, at a temperature of 875° F. and atmospheric pressure, utilizing a feed rate of 1.5 to 7.5 volumes of liquid oil per volume of catalyst. The results achieved and a comparison with the results obtained utilizing a conventional commercial silica-alumina gel cracking catalyst containing approximately 10 weight percent alumina at the same conversion are shown in Table II:

The beneficial effects of steam treatment in enhancing the catalyst activity and selectivity in terms of gasoline production are again evident from the above results and from the graphic presentation in FIGURES 3 and 4 from which it will be seen that higher catalytic activity and increased selectivity in $C_5+$ gasoline yield are obtained at the expense of reduced coke. The data further show the particular catalytic advantages of the combined rare earth-ammonium chloride base exchange method. By reference to FIGURE 3, it will be seen that the activity of the commercial silica-alumina catalyst before steaming at 15 p.s.i.g. was 62.5 volume percent conversion at 1.5 liquid hourly space velocity, which decreased to 42.5 volume percent conversion after a 30 hour steam treatment. In contradistinction, the catalysts of the present invention during similar steam treatment showed little loss and in some instances a gain in activity.

Examples 22 to 25

The compositions of Examples 22 and 24 were prepared in a manner similar to that of Example 1 by base exchanging the hydrogel product with a 2 weight percent rare earth metal chloride solution. The composition of the rare earth metal chloride was that specified in Example 19.

The final catalysts of Examples 22 and 24 were activated by atmospheric steam treating at 1225° F. for 20 hours only, showing activation comparable to Examples 3 and 7. Such activation was only partial compared to that obtained after 150 hours of treating with steam at atmospheric pressure.

The compositions of Examples 23 and 25 were prepared by steam treating portions of the previously unsteamed compositions of Examples 22 and 24 for 20 hours at 1300° F. with steam at atmospheric pressure.

The catalysts of Examples 22 to 25 were tested for activity and selectivity as described above for Examples 1 to 10. The results achieved including a comparison with the results obtained utilizing a conventional commercial silica-alumina gel cracking catalyst containing approximately 10 weight percent alumina at the same conversion are shown below in Table III:

TABLE III

| Example No | 22 | 23 | 24 | 25 |
|---|---|---|---|---|
| Steam Treat: | | | | |
| Time, hrs | 20 | 20 | 20 | 20 |
| Temp., °F | 1,225 | 1,300 | 1,225 | 1,300 |
| Pressure, p.s.i.g | 0 | 0 | 0 | 0 |
| Physical Properties: Surface area, m.$^2$/g | 275 | 222 | 286 | -------- |
| Chemical Composition: | | | | |
| Na, wt. percent | 0.19 | -------- | 0.46 | -------- |
| Ce, wt. percent | -------- | -------- | 5.9 | -------- |
| $(RE)_2O_3$, wt. percent | 11.5 | -------- | 14.5 | -------- |
| $Al_2O_3$, wt. percent | 8.2 | -------- | -------- | -------- |
| Catalytic Evaluation: | | | | |
| Conversion, vol. percent | 67.6 | 66.0 | 64.3 | 63.3 |
| LHSV | 4 | 4 | 4 | 4 |
| 10 R.V.P. gaso., vol. percent | 52.7 | 56.2 | 52.6 | 54.1 |
| Excess $C_4$'s, vol. percent | 15.7 | 12.1 | 12.9 | 11.6 |
| $C_5$+gaso., vol. percent | 50.8 | 53.7 | 50.0 | 51.6 |
| Total $C_4$'s, vol. percent | 17.6 | 14.6 | 15.5 | 36.7 |
| Dry gas, wt. percent | 8.1 | 6.3 | 7.1 | 6.2 |
| Coke, wt. percent | 4.2 | 3.5 | 3.9 | 3.4 |
| $H_2$, wt. percent | 0.04 | 0.02 | 0.037 | 0.03 |
| Δ values to standard silica-alumina catalyst:* | | | | |
| 10 R.V.P., vol. percent | +4.2 | +8.4 | +5.6 | +7.6 |
| Excess $C_4$'s, vol. percent | −1.1 | −4.1 | −2.5 | −3.4 |
| $C_5$+gaso., vol. percent | +4.3 | +8.1 | +5.2 | +7.3 |
| Total $C_4$'s, vol. percent | −1.2 | −3.7 | −2.0 | −3.1 |
| Dry gas, wt. percent | −0.9 | −2.4 | −1.3 | −1.9 |
| Coke, wt. percent | −1.8 | −2.2 | −1.4 | −2.2 |

*Commercial silica-alumina gel cracking catalyst containing about 10 wt. percent $Al_2O_3$ and remainder $SiO_2$.

A comparison of the data presented in Table III for Examples 22 to 25 shows that treatment with steam at 1300° F. for a shorter interval of time can also be used to effectively activate the rare earth metal aluminosilicate catalyst. The activation appears as improved selectivity advantage over standard silica-alumina catalyst. Such selectivity advantage obtained in treatment of the catalysts of Examples 23 and 25 at 1300° F. was equivalent to the selectivity advantage shown by the compositions of Examples 4 and 8 which had been steam treated for 40 hours at 1225° F.

The following examples show that an alumina matrix containing crystalline rare earth metal aluminosilicate affords catalysts characterized by greater activity and selectivity after steam treatment than that of a standard silica-alumina catalyst.

Example 26

To 113.57 grams of rare earth metal aluminosilicate, prepared by base exchanging 13X sodium aluminosilicate with a 5 weight percent rare earth metal chloride solution at 180° F. to a sodium content of 0.53 weight percent, was added 1.725 pounds of sodium aluminate (containing 43.5 weight percent $Al_2O_3$), which was diluted to 11,500 cc. volume with water. To this mixture was added 890 cc. of dilute $H_2SO_4$ (40 weight percent $H_2SO_4$), the pH of the resulting composite being 8.4. The mixture so obtained was allowed to stand overnight at room temperature and then filtered. The filter cake obtained was base exchanged with a 5 weight percent aqueous solution of ammonium chloride using one volume of solution per volume of cake for a total of 18 two hour and 6 overnight changes. The cake was then washed free of sulfate ions, dried at 270° F. in air for 24 hours, tempered 10 hours at 1000° F. in air and thereafter stabilized by contacting with steam at 15 p.s.i.g. and 1200° F. for 24 hours. The final catalyst contained, by analysis, 0.04 weight percent sodium and 5.1 percent rare earth metal oxides.

Example 27

The catalyst of this example was prepared in the same manner as that of Example 26 except that HCl was used to precipitate the sodium aluminate—sodium aluminosilicate mixture. This catalyst contained, by analysis, 0.04 weight percent sodium and 5.09 percent rare earth metal oxides.

Catalytic evaluation of the catalysts of Examples 26 and 27 was carried out under the same conditions specified for Examples 1 to 10 and the results are shown below in Table IV, for the steamed catalysts:

TABLE IV

| Example No | 26 | 27 |
|---|---|---|
| Steam Treat: | | |
| Time, hrs | 24 | 24 |
| Temp., °F | 1,200 | 1,200 |
| Pressure, p.s.i.g | 15 | 15 |
| Physical Properties: | | |
| App., dens. g./cc | 0.75 | 0.74 |
| Surface area, m.²/g., steamed | | |
| Catalytic Evaluation: | | |
| Conversion, vol. percent | 56.8 | 61.9 |
| LHSV | 4 | 4 |
| 10 R.V.P. gaso., vol. percent | 47.0 | 50.7 |
| Excess $C_4$'s, vol. percent | 10.4 | 11.2 |
| $C_5+$ gasoline, vol. percent | 44.6 | 48.2 |
| Total $C_4$'s, vol. percent | 12.8 | 13.7 |
| Dry gas, wt. percent | 6.01 | 7.1 |
| Coke, wt. percent | 3.8 | 4.2 |
| $H_2$, wt. percent | 0.20 | 0.16 |
| Δ values to standard silica-alumina catalyst:* | | |
| 10 R.V.P., vol. percent | +3.8 | +4.9 |
| Excess $C_4$'s, vol. percent | −2.2 | −3.3 |
| $C_5+$ gasoline, vol. percent | +3.6 | +4.7 |
| Total $C_4$'s, vol. percent | −2.1 | −2.8 |
| Dry gas, wt. percent | −1.1 | −1.0 |
| Coke, wt. percent | −0.2 | −0.5 |

*Commercial silica-alumina gel cracking catalyst containing about 10 wt. percent $Al_2O_3$ and remainder $SiO_2$.

It will be evident from the foregoing results that the catalyst of rare earth metal aluminosilicate dispersed in an alumina matrix exhibited high activity and selectivity advantages after having undergone activation with steam.

Examples 28 to 29

The catalysts of these examples were prepared as in Example 1 by dispersing a crystalline aluminosilicate in a silica-alumina matrix containing 94 weight percent $SiO_2$ and 6 percent $Al_2O_3$. The crystalline sodium aluminosilicate, however, in these examples was base exchanged at 180° F. with a 5 weight percent aqueous rare earth metal chloride solution, having the composition previously described, prior to dispersion in the matrix. The resulting hydrosol having a pH of 8.5 and containing, on a dry basis, 25 weight percent rare earth metal aluminosilicate was formed into hydrogel beads. The hydrogel beads so obtained were then base exchanged substantially free of sodium ions only with a 1 weight percent aqueous $NH_4Cl$ solution using 9 two hour and 3 overnight contacts. The exchanged hydrogel was washed free of chloride ions, dried at 270° F. in air for 24 hours and then tempered for 10 hours at 1000° F. in air.

The resulting catalytic composition, containing 7.16 weight percent rare earth metal oxides, 11.6 percent alumina, 0.35 percent sodium and the remainder silica, was evaluated, as in Examples 1 to 10 before (Example 28) and after (Example 29) steam activation. The results are shown below in Table V:

TABLE V

| Example No | 28 | 29 |
|---|---|---|
| Steam Treat: | | |
| Time, hrs | 0 | 20 |
| Temp., °F | | 1,225 |
| Pressure, p.s.i.g | | 0 |
| Physical Properties: Surface Area, m.²/g., steamed | | 252 |
| Catalytic Evaluation: | | |
| Conversion, vol. percent | 65.7 | 63.7 |
| LHSV | 4 | 4 |
| 10 R.V.P. gasoline, vol. percent | 47.9 | 52.2 |
| Excess $C_4$'s, vol. percent | 16.5 | 12.6 |
| $C_5+$ gasoline, vol. percent | 46.3 | 49.3 |
| Total $C_4$'s, vol. percent | 18.1 | 15.5 |
| Dry gas, wt. percent | 8.1 | 6.9 |
| Coke, wt. percent | 6.2 | 3.7 |
| $H_2$, wt. percent | 0.07 | 0.03 |
| Δ values to standard silica-alumina catalyst:* | | |
| 10 R.V.P., vol. percent | +0.2 | +5.5 |
| Excess $C_4$'s, vol. percent | +0.5 | −2.6 |
| $C_5+$ gasoline, vol. percent | +0.8 | +4.7 |
| Total $C_4$'s, vol. percent | +0.1 | −1.8 |
| Dry gas, wt. percent | −0.6 | −1.4 |
| Coke, wt. percent | +0.6 | −1.5 |

*Silica-alumina gel cracking catalyst containing about 10 wt. percent $Al_2O_3$ and remainder $SiO_2$.

The above data again established that steam treatment of the specified catalyst serves to enhance the activity and selectivity thereof in terms of gasoline production. Thus, it will be seen that the steam treatment greatly improves the selectivity, increasing the $C_5+$ gasoline advantage from +0.8 to +4.7 volume percent advantage over the standard silica-alumina cracking catalyst. The dry gas advantage was also increased from −0.6 weight percent to −1.4 percent and the coke was improved from +0.6 weight percent for the fresh catalyst to −1.5 percent for the steam activated catalyst.

The following examples show that a natural siliceous clay matrix containing crystalline rare earth metal aluminosilicate affords catalysts characterized by greater activity and selectivity after steam treatment than that of a standard silica-alumina catalyst.

Examples 30 to 31

The catalysts of these examples were prepared by dispersing 167 grams of a wet cake (60 percent solids) of a sodium crystalline aluminosilicate pre-exchanged with rare earth metal chloride and ammonium chloride into 300 grams of dry raw kaolinite clay. The pre-exchanged aluminosilicate constituted 25 weight percent of the total composite. The pre-exchanged material was mixed with the clay and sufficient water to render the resulting mixture plastic, and extruded to 3/16" pellets, dried at 230° F. in air and tempered for 10 hours at 1000° F. in air.

The resulting catalytic composition containing 5 weight percent rare earth metal oxides was evaluated as in Examples 1 to 10 before (Example 30) and after (Example 31) steam activation. The results are shown below in Table VI:

TABLE VI

| Example No | 30 | 31 |
|---|---|---|
| Steam Treat: | | |
| Time, hrs | 0 | 24 |
| Temp., °F | | 1,200 |
| Pressure, p.s.i.g | | 15 |
| Physical Properties: Surface area, m.²/g | 119 | 93 |
| Catalytic Evaluation: | | |
| Conversion, vol. percent | 52.1 | 73.2 |
| LHSV | 4 | 4 |
| 10 R.V.P. gaso., vol. percent | 36.2 | 60.4 |
| Excess $C_4$'s, vol. percent | 11.6 | 14.5 |
| $C_5+$ gasoline, vol. percent | 34.3 | 57.9 |
| Total, $C_4$'s, vol. percent | 13.6 | 17.0 |
| Dry gas, wt. percent | 8.1 | 7.8 |
| Coke, wt. percent | 5.5 | 3.9 |
| $H_2$, wt. percent | 0.39 | 0.11 |
| Δ values to standard silica-alumina catalyst:* | | |
| 10 R.V.P., vol. percent | −4.6 | +9.7 |
| Excess $C_4$'s, vol. percent | +0.4 | +5.1 |
| $C_5+$ gasoline, vol. percent | −4.2 | +9.1 |
| Total, $C_4$'s, vol. percent | +0.1 | −4.4 |
| Dry gas wt. percent | +1.8 | −2.4 |
| Coke, wt. percent | +2.2 | −3.3 |

*Silica-alumina gel cracking catalyst containing about 10 wt. percent $Al_2O_3$ and remainder $SiO_2$.

The foregoing data once again show that steam treatment of the catalyst serves to increase the activity and selectivity thereof in terms of gasoline production. Steam treatment treatment greatly improves the selectivity, increasing the $C_5+$ gasoline advantage from −4.2 to +9.1 volume precent advantage over the standard silica-alumina cracking catalyst. The dry gas advantage was also increased from +1.8 to −2.4 weight percent and the coke was improved from +2.2 for the fresh catalyst to −3.3 weight percent for the steam activated catalyst.

The following examples show that calcium exchanged crystalline aluminosilicates, alone and dispersed in a silica-alumina matrix, afford catalysts characterized by greater activity and selectivity after steam treatment than that of a standard cracking catalyst.

Examples 32 to 35

For Examples 32 and 33 an undiluted crystalline calcium acid aluminosilicate was prepared by treating a 13X sodium aluminosilicate with a 26 percent aqueous calcium chloride solution at 180° F. for four 16-hour batch exchanges, and then with a 2 percent calcium chloride plus 1 percent ammonium chloride solution for four 2-hour batch exchanges. The acid calcium aluminosilicate was water washed, dried and calcined for 10 hours at 1000° F.

The resulting catalytic composition, containing 8.4 weight percent calcium and 0.65 percent sodium, was evaluated before (Example 32) and after (Example 33) steam treatment, by conversion of a Mid-Continent wide range gas oil by passage of vapors of said gas oil through the catalyst at 875° F. substantially atmospheric pressure and at a feed rate of 7.5 volumes of liquid oil per volume of catalyst per hour for 10 minute runs between regenerations.

For Examples 34 and 35 a 13X sodium aluminosilicate was dispersed in a silica-alumina hydrogel (93 weight percent silica and 7 percent alumina) in proportions to give a hydrogel containing 25 weight percent aluminosilicate. The hydrogel beads were treated with a 2 percent aqueous calcium chloride solution at room temperature in four 2-hour batch exchanges and then with a 2 percent calcium chloride plus 1 percent ammonium chloride solution for eight 2-hour batches. The product was water washed, dried and calcined for 10 hours at 1000° F.

The resulting catalyst composition, containing 4.28 weight percent calcium and 0.59 percent sodium, was evaluated before (Example 34) and after (Example 35) steam treatment as in Examples 32 and 33.

The results achieved for Examples 32 to 35 and a comparison with the results obtained utilizing a conventional commercial silica-alumina cracking catalyst containing about 10 weight percent alumina and remainder silica at the same conversion are shown below in Table VII:

TABLE VII

| Example No. | 32 | 33 | 34 | 35 |
|---|---|---|---|---|
| Steam Treat: | | | | |
| Time, hrs | 0 | 20 | 0 | 20 |
| Temp., °F | | 1,225 | | 1,225 |
| Pressure, p.s.i.g | | 0 | | 0 |
| Catalytic Evaluation: | | | | |
| Conversion, vol. percent | 68.5 | 69.7 | 74.9 | 67.7 |
| LHSV | 7.5 | 7.5 | 3 | 3 |
| 10 R.V.P. gaso., vol. percent | 53.5 | 59.3 | 46.5 | 55.9 |
| Excess C₄'s, vol. percent | 14.7 | 12.3 | 25.7 | 13.4 |
| C₅+ gasoline, vol. percent | 51.1 | 56.1 | 45.8 | 53.4 |
| Total C₄'s, vol. percent | 17.1 | 15.5 | 26.5 | 15.9 |
| Dry gas, wt. percent | 6.3 | 5.5 | 10.0 | 6.4 |
| Coke, wt. percent | 7.5 | 5.2 | 8.3 | 4.3 |
| H₂, wt. percent | .02 | .02 | .04 | .02 |
| Δ values to std. silica-alumina catalyst:* | | | | |
| 10 R.V.P., vol. percent | +7.8 | +13.3 | −1.2 | +12.6 |
| C₅+ gasoline, vol. percent | +7.7 | +12.4 | +0.4 | +12.2 |
| Total C₄'s, vol. percent | −6.4 | −7.9 | −0.7 | −8.1 |
| Dry gas, wt. percent | −3.0 | −4.0 | −0.5 | −1.9 |
| Coke, wt. percent | +0.8 | −1.8 | +0.3 | −1.0 |

*Silica-alumina gel cracking catalyst containing about 10 wt. percent Al₂O₃ and remainder SiO₂.

*Examples 36 to 39*

For Examples 36 and 37 an undiluated crystalline calcium acid Y faujasite was prepared by treating zeolite Y with a 5 percent calcium chloride plus 2 percent ammonium chloride solution at 180° F. for 30 hours. The final product contained 6.4 weight percent calcium, 0.14 percent sodium, 19.6 percent alumina and 71.8 percent silica.

For Examples 38 and 39 a sodium zeolite Y and McNamee clay were dispersed in a silica-alumina hydrosol (94 weight percent silica and 6 percent alumina) in proportions to give 10 percent zeolite Y and 15 percent clay in the matrix. The hydrogel beads were treated with a 1 percent calcium chloride plus 1 percent ammonium chloride solution for 24 hours. The final product contained 1.4 weight percent calcium and 0.19 percent sodium.

The catalysts of Examples 36 to 39 were evaluated in a manner analogous to that used for Examples 1 to 10 and the results are shown below in Table VIII, for both fresh (Example 36) and steamed (Example 37) undiluted calcium acid Y faujasite and for fresh (Example 30) and steamed (Example 39) calcium acid Y faujasite in a silica-alumina matrix. The results are compared with the results obtained utilizing a conventional commercial silica-alumina bead cracking catalyst at the same conversion.

TABLE VIII

| Example No. | 36 | 37 | 38 | 39 |
|---|---|---|---|---|
| Steam Treat: | | | | |
| Time, hrs | 0 | 24 | 0 | 24 |
| Temp., °F | | 1,225 | | 1,225 |
| Pressure, p.s.i.g | | 15 | | 15 |
| Catalytic Evaluation: | | | | |
| Conversion, vol. percent | 70.3 | 72.1 | 58.2 | 50.9 |
| LHSV | 10 | 10 | 4 | 4 |
| C₅+ gasoline, vol. percent | 45.8 | 60.6 | 39.0 | 43.7 |
| Total C₄'s, vol. percent | 21.8 | 14.6 | 15.8 | 9.8 |
| Dry gas, wt. percent | 10.3 | 7.0 | 7.9 | 4.3 |
| Coke, wt. percent | 5.3 | 1.9 | 5.6 | 1.2 |
| H₂, wt. percent | 0.04 | 0.01 | 0.14 | 0.02 |
| Δ values to std. silica-alumina catalyst:* | | | | |
| C₅+ gasoline, vol. percent | −1.0 | +12.9 | +2.6 | +6.9 |
| Total C₄'s, vol. percent | +2.1 | −5.8 | +0.3 | −2.9 |
| Dry gas, wt. percent | +0.8 | −2.7 | +0.3 | −2.1 |
| Coke, wt. percent | −1.1 | −5.0 | +1.5 | −1.8 |

*Silica-alumina gel cracking catalyst containing about 10 wt. percent Al₂O₃ and remainder SiO₂.

The foregoing examples clearly show the steam treatment of calcium acid aluminosilicate, of either the X or Y structure, undiluted or in a porous matrix such as silica-alumina, effects significant and unexpected improvement in catalytic selectivity and activity. Although activity improvement generally is achieved by steam treatment, the striking improvement in selectivity is of major importance. For example, as shown by a comparison of Examples 36 and 37, a calcium acid Y aluminosilicate in a silica alumina matrix, upon steaming, showed a delta value improvement of from −1.0 to +12.9 in C₅+ gasoline, from +2.1 to −5.8 in total C₄'s, and similar improvements in dry gas and coke reduction. It should be noted that the fresh catalyst of Example 36 is slightly inferior to silica-alumina under the test conditions, while steam treatment converted said catalyst to a vastly superior, highly selective and active cracking catalyst.

The following examples show that manganese exchanged crystalline aluminosilicates, both the X and Y structures, afford catalysts characterized by greater activity and selectivity after steam treatment than that of a standard silica-alumina catalyst.

*Examples 40 to 41*

For Examples 40 and 41 an undiluted crystalline manganese acid aluminosilicate was prepared by treating a 13X sodium aluminosilicate with a 2 percent manganese chloride plus 1 percent ammonium chloride solution at 180° F. for 7 days. The final catalyst contained 12.3 weight percent manganese and 0.52 percent sodium.

*Examples 42 to 43*

For Examples 42 and 43 an undiluted crystalline manganese acid aluminosilicate was prepared by treating zeolite Y with a 2 percent manganese chloride plus 1 percent ammonium chloride solution at 180° F. for 12 days. The final catalyst contained 5.25 percent manganese and 1.25 percent sodium.

The catalysts of Examples 40 to 43 were washed free of chloride ions, dried and calcined, and evaluated in a manner analogous to that used for Examples 1 to 10 and the results are shown below in Table IX for both fresh (Examples 40 and 42) and steamed (Examples 41 and 43) catalysts. The results are compared with the results obtained utilizing a conventional commercial silica-alumina cracking catalyst at the same conversion.

TABLE IX

| Example No. | 40 | 41 | 42 | 43 |
|---|---|---|---|---|
| Steam Treat: | | | | |
| Time, hrs | 0 | 20 | 0 | 24 |
| Temp., °F | | 1,225 | | 1,200 |
| Pressure, p.s.i.g | | 0 | | 15 |
| Catalytic Evaluation: | | | | |
| Conversion, vol. percent | 57.3 | 53.1 | 35.5 | 61.9 |
| LHSV | 16 | 16 | 16 | 16 |
| $C_5+$ gasoline, vol. percent | 42.9 | 48.0 | 20.1 | 55.4 |
| Total, $C_4$'s, vol. percent | 11.2 | 8.4 | 10.9 | 11.4 |
| Dry gas, wt. percent | 5.7 | 4.2 | 6.4 | 4.8 |
| Coke, wt. percent | 4.0 | 1.5 | 4.7 | 0.9 |
| $H_2$, wt. percent | 0.07 | 0.05 | 0.04 | 0.02 |
| Δ values to std. silica-alumina catalyst:* | | | | |
| $C_5+$ gasoline, vol. percent | +1.8 | +9.3 | −8.1 | +12.0 |
| Total, $C_4$'s, vol. percent | −4.0 | −5.3 | +2.9 | −5.3 |
| Dry gas, wt. percent | −1.7 | −2.6 | +2.0 | −3.3 |
| Coke, wt. percent | 0.0 | −1.9 | +3.1 | −3.9 |

*Silica-alumina gel cracking catalyst containing about 10 wt. percent $Al_2O_3$ and remainder $SiO_2$.

The foregoing examples clearly show that steam treatment of manganese acid aluminosilicates, of either the X or Y structure, effects significant and unexpected improvement in catalytic selectivity and activity. For example, as shown by a comparison of Examples 42 and 43, a manganese acid Y aluminosilicate upon steaming showed a delta value improvement of from −8.1 to +12.0 in $C_5+$ gasoline, with a similar improvement in total $C_4$'s, dry gas and coke reduction. It should be noted that the fresh catalyst of Example 42 is decidedly inferior to silica-alumina under the test conditions, while steam treatment converted said catalyst to a vastly superior, highly selective and active cracking catalyst.

The following examples show that an ammonium exchanged acid Y aluminosilicate affects a catalyst characterized by greater activity and selectivity after steam treatment than that of a standard silica-alumina catalyst.

Examples 44 to 45

For Examples 44 and 45 an undiluted crystalline acid aluminosilicate was prepared by treating zeolite Y with a 25 percent ammonium chloride solution. The exchanged aluminosilicate was water washed, dried and calcined, whereupon ammonia was driven off to convert the aluminosilicate to the acid form. The final catalyst contained 0.45 weight percent sodium 23.3 percent alumina and 75.5 percent silica. The catalyst was evaluated in a manner analogous to that used for Examples 1 to 10 and the results are shown below in Table X for both fresh

TABLE X

| Example No. | 44 | 45 |
|---|---|---|
| Steam Treat: | | |
| Time, hrs | 0 | 24 |
| Temp., °F | | 1,200 |
| Pressure, p.s.i.g | | 15 |
| Catalytic Evaluation: | | |
| Conversion, vol. percent | 36.1 | 66.1 |
| LHSV | 10 | 10 |
| 10 R.V.P. gaso., vol. percent | 12.8 | 59.9 |
| Excess $C_4$'s, vol. percent | 12.1 | 11.1 |
| $C_5+$ gasoline, vol. percent | 12.5 | 56.9 |
| Total, $C_4$'s, vol. percent | 12.5 | 14.1 |
| Dry gas, wt. percent | 9.7 | 5.6 |
| Coke, wt. percent | 7.1 | 1.11 |
| $H_2$, wt. percent | 0.11 | 0.01 |
| Δ values to std. silica-alumina catalyst:* | | |
| 10 R.V.P. gaso., vol. percent | −17.2 | +12.6 |
| Excess $C_4$'s, vol. percent | +5.2 | −5.7 |
| $C_5+$ gasoline, vol. percent | −15.8 | +11.3 |
| Total, $C_4$'s, vol. percent | +4.5 | −4.4 |
| Dry gas, wt. percent | +5.2 | −2.9 |
| Coke, wt. percent | +5.5 | −4.4 |

*Silica-alumina gel cracking catalyst containing about 10 wt. percent $Al_2O_3$ and remainder $SiO_2$.

(Example 44) and steamed (Example 45) catalysts. The results are compared with the results obtained utilizing a conventional commercial silica-alumina cracking catalyst at the same conversion.

Examples 46 to 47

For Examples 46 and 47 a half-pound sample of zeolite Y was treated with 760 g. $MgCl_2 \cdot 6H_2O$ in 2280 cc. $H_2O$ for 20 hours at 180° F., then was filtered, washed and dried for 20 hours at 270° F. Half of this dried material was recontacted at 180° F. with a solution containing 380 g. $MgCl_2 \cdot 6H_2O$ in 1140 cc. of $H_2O$ for 20 hours. It was then filtered, washed and redried. Another identical contact with $MgCl_2$ solution was made, the product washed, dried at 270° F. for 20 hours, pelletted to 4 x 10 mesh and calcined at 1000° F. for 10 hours. A portion was then evaluated (as Example 46) in a manner analogous to that used for Examples 1 to 10. At 16 LHSV it gave 44.7% conversion of the gas oil with a yield of 22.3% $C_5+$ gasoline. This is 7% less gasoline than given by the standard silica-alumina catalyst at the same conversion.

A portion of the calcined catalyst above was treated for 24 hours at 1225° F. with 100% steam at atmospheric pressure. It was then evaluated (as Example 47) in a manner identical to Example 46. This catalyst gave 70.4% conversion (also at 16 LHSV) with a 61.2% yield of $C_5+$ gasoline. This is 13.7% more gasoline than given by the standard silica-alumina catalyst at the same conversion. Again the improvement brought about by steam treatment is obvious.

The foregoing examples clearly show that steam treatment of an acid Y aluminosilicate effects a significant and unexpected improvement in catalytic selectivity and activity. For example, as shown by a comparison of Examples 44 and 45, an acid Y aluminosilicate upon steaming showed a delta value improvement of from −17.2 to +12.6 in 10 R.V.P. gasoline, with similar improvements in $C_5+$ gasoline and reduction in excess of $C_4$'s, total $C_4$'s, dry gas and coke formation. It should be noted that fresh acid Y is inferior to silica-alumina, while steam treated acid Y exhibited vastly improved selectivity and activity.

According to the method of the present invention, it has been found advantageous to contact a sodium crystalline aluminosilicate of the Y type, combined in a matrix of clay or an inorganic oxide gel, with steam as in the above examples. The steam treated composite resulting therefrom is largely in the acid form having a low sodium content and exhibiting high catalytic selectivity and activity.

This application is a continuation-in-part of our copending application Ser. No. 159,626, filed Dec. 15, 1961 which, in turn, is a continuation-in-part of our copending application Ser. No. 42,284, filed July 12, 1960, now U.S. Patent No. 3,140,249.

It will be evident from the foregoing examples described herein that crystalline aluminosilicates, upon steam treatment, become vastly improved catalytic cracking components exhibiting activity and selectivity unexpectedly superior both to their unsteamed form and to conventional commercial cracking catalysts. It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

We claim:

1. A method for activating a catalytic composition which comprises subjecting a crystalline aluminosilicate having uniform pore openings between about 6 and about 15 Angstrom units and an exchangeable alkali metal content of less than about 3 percent by weight to treatment with steam at a temperature between about 400 and about 1750° F. for at least about 30 minutes.

2. The method of claim 1 wherein said crystalline aluminosilicate is base exchanged prior to steam treatment with ions selected from the group consisting of rare earths, calcium, manganese, magnesium, hydrogen, hydrogen precursors and mixtures thereof with one another.

3. A method for activating a catalytic composition which comprises intimately admixing a crystalline aluminosilicate having uniform pore openings between about 6 and about 15 Angstrom units in finely divided form in a matrix and treating the resulting composite characterized by an exchangeable alkali metal content of less than about 3 percent by weight with steam at a temperature between about 400 and about 1750° F. for at least 30 minutes.

4. The method of claim 3 wherein said crystalline aluminosilicate is base exchanged prior to steam treatment with ions selected from the group consisting of rare earths, calcium, manganese, magnesium, hydrogen, hydrogen precursors and mixtures thereof with one another.

5. A method for activating a catalytic composition which comprises intimately admixing with a hydrous oxide, selected from the group consisting of clays and inorganic oxide gels, a crystalline aluminosilicate having uniform pore openings between about 6 and about 15 Angstrom units obtained by base exchange of a crystsalline alkali metal aluminosilicate with ions selected from the group consisting of rare earths, calcium, manganese, magnesium, hydrogen, hydrogen precursors and mixtures thereof with one another, and activating the resulting composite characterized by an exchangeable alkali metal content of less than about 3 percent by weight by exposing to a steam atmosphere for at least about 2 hours at a temperature between about 400 and about 1450° F.

6. A catalytic composition comprising a crystalline aluminosilicate having uniform pore openings between about 6 and about 15 Angstrom units and an exchangeable alkali metal content of less than about 3 percent by weight which has been subjected to activation with steam at a temperature between about 400 and about 1450° F. for at least 2 hours.

7. The catalytic composition of claim 6 wherein said crystalline aluminosilicate is base exchanged prior to steam activation with ions selected from the group consisting of rare earths, calcium, manganese, magnesium, hydrogen, hydrogen precursors and mixtures thereof with one another.

8. A porous catalytic composition characterized by an exchangeable alkali metal content of less than about 3 percent by weight consisting essentially of 1 to 90 percent by weight of a crystalline aluminosilicate having uniform pore openings between about 6 and about 15 Angstrom units and a weight mean particle diameter of less than 40 microns suspended in and distributed throughout an inorganic oxide gel matrix and which has been subjected to activation with steam at a temperature between about 400 and about 1450° F. for at least 2 hours.

9. The catalytic composition of claim 8 wherein said crystalline aluminosilicate is base exchanged prior to steam activation with ions selected from the group consisting of rare earths, calcium, manganese, magnesium, hydrogen, hydrogen precursors and mixtures thereof with one another.

10. A porous catalytic composition characterized by an exchangeable alkali metal content of less than about 3 percent by weight consisting essentially of 1 to 90 percent by weight of a crystalline aluminosilicate having uniform pore openings between about 6 and about 15 Angstrom units and a weight mean particle diameter of less than 15 microns suspended in and distributed throughout a siliceous gel matrix, said composition having had an initial surface area in the approximate range of 100 to 600 square meters per gram, which surface area has been reduced by steam activation by at least 20 percent but not in excess of about 80 percent, whereby said composition of reduced surface area exhibits enhanced catalytic ability for the production of gasoline in the catalytic cracking of petroleum stocks.

11. The catalytic composition of claim 10 wherein said crystalline aluminosilicate had been base exchanged prior to steam activation with ions selected from the group consisting of rare earths, calcium, manganese, magnesium, hydrogen, hydrogen precursors and mixtures thereof with one another.

12. A catalytic composition characterized by an exchangeable alkali metal content of less than about 3 percent by weight comprising spheroidal particles consisting essentially of 2 to 50 percent by weight of a crystalline aluminosilicate having uniform pore openings between about 6 and about 15 Angstrom units, base-exchanged with ions selected from the group consisting of rare earths, calcium, manganese, magnesium, hydrogen, hydrogen precursors and mixtures thereof with one another, said aluminosilicate having a weight mean particle diameter of between 2 and 7 microns suspended in and distributed throughout a matrix, being of an inorganic oxide gel selected from the group consisting of alumina, silica, and composites of silica and an oxide of at least one metal selected from the group consisting of metals of Groups IIA, IIIB, and IVA of the Periodic Table, which particles have undergone activation with steam at a temperature of between about 400 and about 1450° F. for at least about 2 hours.

13. A catalyst composition resulting from intimate admixture of a finely divided crystalline aluminosilicate having uniform pore openings between about 6 and about 15 Angstrom units and having an alkali metal content below about 1 percent by weight, based on the final composition, and containing ions selected from the group consisting of rare earths, calcium, manganese, magnesium, hydrogen, hydrogen precursors and mixtures thereof with one another, with a binder therefor, and activation of the resulting composite with steam at a temperature between about 400 and about 1450° F. for at least 2 hours, to reduce the initial surface area of said composite by at least about 20 percent but not in excess of about 80 percent.

14. A catalyst composition comprising a crystalline aluminosilicate having uniform pore openings between about 6 and about 15 Angstrom units and containing less than about 3 percent sodium by weight, which aluminosilicate is in finely divided form bound together in an agglomerated mass, the resulting composite having been subjected to activation with steam to reduce the initial surface area thereof by at least about 20 percent but not in excess of about 80 percent.

15. The catalytic composition of claim 14 wherein said crystalline aluminosilicate having an alkali metal content below about 1 percent by weight, based on the final composition, and is base exchanged prior to steam activation with ions selected from the group consisting of rare earths, calcium, manganese, magnesium, hydrogen, hydrogen precursors and mixtures thereof with one another.

16. A process for converting hydrocarbons which comprises contacting the same under hydrocarbon conversion conditions with a catalyst comprising a crystalline aluminosilicate having uniform pore openings between about 6 and about 15 Angstrom units, which aluminosilicate is in finely divided form bound together in an agglomerated mass, the resulting composite characterized by an exchangeable alkali metal content of less than about 3 percent by weight having been subjected to activation with steam to reduce the initial surface area thereof by at least about 20 percent but not in excess of about 80 percent.

17. The process of claim 16 wherein said crystalline aluminosilicate is base exchanged prior to steam activation with ions selected from the group consisting of rare earths, calcium, manganese, magnesium, hydrogen, hydrogen precursors and mixtures thereof with one another.

18. A process for converting hydrocarbons which comprises contacting the same under hydrocarbon conversion conditions with a porous composition, characterized by an exchangeable alkali metal content of less than about 3 percent by weight, consisting essentially of 1 to 90 percent by weight of a rare earth metal crystalline aluminosilicate having uniform pore openings between about 6 and about 15 Angstrom units in finely divided form intimately combined with a hydrous oxide selected from the group consisting of clays and inorganic oxide gels and which has been subjected to activation with steam to reduce the initial surface area thereof by at least about 20 percent but not in excess of about 80 percent.

19. A process for converting hydrocarbons which comprises contacting the same under hydrocarbon conversion conditions with the catalytic composition of claim 6.

20. A process for cracking a hydrocarbon charge which comprises contacting said charge under catalytic cracking conditions with a catalyst composition, characterized by an exchangeable alkali metal content of less than about 3 percent by weight, comprising a crystalline aluminosilicate having uniform pore openings between about 6 and about 15 Angstrom units, which composition has been subjected to activation with steam at a temperature of between about 400 and about 1450° F. for at least about 2 hours.

21. The process of claim 20 wherein said crystalline aluminosilicate is base exchanged prior to steam activation with ions selected from the group consisting of rare earths, calcium, manganese, magnesium, hydrogen, hydrogen precursors and mixtures thereof with one another.

22. A process for cracking a hydrocarbon charge which comprises contacting said charge under catalytic cracking conditions with a catalyst composition comprising a crystalline aluminosilicate having uniform pore openings between about 6 and about 15 Angstrom units and containing less than about 3 percent sodium by weight, which aluminosilicate is in finely divided form bound together in an agglomerated mass, the resulting composite having been subjected to activation with steam to reduce the initial surface area thereof by at least about 20 percent but not in excess of about 80 percent.

23. The process of claim 22 wherein said crystalline aluminosilicate is base exchanged prior to steam activation with ions selected from the group consisting of rare earths, calcium, manganese, magnesium, hydrogen, hydrogen precursors and mixtures thereof with one another.

References Cited by the Examiner

UNITED STATES PATENTS 3,140,249   7/1964   Plank et al. _________ 208—120

DELBERT E. GANTZ, *Primary Examiner.*

ALPHONSO D. SULLIVAN, *Examiner.*

A. RIMENS, *Assistant Examiner.*

UNITED STATES PATENT OFFICE
CERTIFICATE OF CORRECTION

Patent No. 3,257,310                                             June 21, 1966

Charles J. Plank et al.

It is hereby certified that error appears in the above numbered patent requiring correction and that the said Letters Patent should read as corrected below.

Column 3, line 2, for "theerof" read -- thereof --; line 12, for "essential" read -- essentially --; column 5, line 56, for "silceous" read -- siliceous --; column 7, line 36, for "ration" read -- ratio --; column 9, line 2, for "steam at temperature" read -- steam at a temperature --; column 15, TABLE IV, Example 27, line 21, for "0.5" read -- 0.6 --; column 16, TABLE VI, Example 31, line 49, for "÷5.1" read -- 5.1 --; column 17, line 60, for "undiluated" read -- undiluted --; column 22, lines 52 to 54, strike out "having an alkali metal content below about 1 percent by weight, based on the final composition, and".

Signed and sealed this 22nd day of August 1967.

(SEAL)
Attest:

ERNEST W. SWIDER                                    EDWARD J. BRENNER
Attesting Officer                                  Commissioner of Patents

Disclaimer 3,257,310.—*Charles J. Plank*, Woodbury, and *Edward J. Rosinski*, Deptford, N.J. STEAM ACTIVATED CATALYST. Patent dated June 21, 1966. Disclaimer filed Nov. 20, 1968, by the assignee, *Mobil Oil Corporation*.

Hereby disclaims the terminal portion of the term of the patent subsequent to July 7, 1981.

[*Official Gazette April 1, 1969.*]